United States Patent Office 3,305,531
Patented Feb. 21, 1967

3,305,531
PROCESS FOR THE PRODUCTION OF
POLYALDEHYDES
Charles Kenneth Warren, Welwyn Garden City, England, assignor to Imperial Chemical Industries Limited, London, England, a corporation of Great Britain
No Drawing. Filed June 6, 1963, Ser. No. 285,861
Claims priority, application Great Britain, June 12, 1962, 22,523/62
4 Claims. (Cl. 260—67)

The present invention relates to an improved method for the production of polymers, particularly polyaldehydes.

Polyaldehydes comprise chains of alternate carbon and oxygen atoms and those of high molecular weight, more particularly the crystalline polyaldehydes, are useful thermoplastic materials especially for the formation of films and fibres. Such polymers may be prepared by the polymerisation of aldehydes in the presence of anionic catalysts such as elemental alkali metals, alkali metal alkyls, cycloalkyls, aryls, alkenyls or hydrides, alkali metal aluminum hydrides and alkali metal alcoholates.

These alkali metal catalysts may catalyse both the polymerisation of the monomer and the degradation of the polymer so formed, the predominance of one over the other depending upon the prevalent conditions. For example, for acetaldehyde at temperatures below $-30°$ C., and more particularly below about $-60°$ C., the polymerisation reaction predominates, while at temperatures above $-30°$ C. and especially about $0°$ C., the degradation reaction predominates. Thus, where the polymerisation of an aldehyde has been catalysed by an alkali metal catalyst, it is desirable to remove the catalyst from the polymer or to destroy it before the temperature of the reaction vessel is raised and the catalyst can act to catalyse the degradation of the polymer.

The normal method of removing the catalyst is by adding water or an alcohol to the polymerisation medium immediately after the polymerisation and then separating the insoluble polymer. However, this process suffers from several defects: first, it is very difficult to ensure complete separation of the polymer from the catalyst by such a method and second, the action of an alcohol or water on the alkali metal catalyst used will in most cases cause either the formation of the appropriate alkali metal alkoxide which is an equally strong catalyst for the degradation of the polymers at elevated temperatures, or the formation of the hydroxide which will degrade the polymer even at low temperatures.

We have now found a method for rendering the alkali metal catalysts inactive after the polymerisation reaction without forming by-products which also have catalytic activity.

According to the present invention we provide a process for the manufacture of a polymeric aldehyde by the polymerisation of an aldehyde in the presence of an alkali metal catalyst as hereinafter defined at a temperature below that at which the alkali metal catalyst will also act as a catalyst to degrade the polymeric product in which after the polymerisation is completed and before the reaction medium reaches a temperature at which substantial degradation of the polymeric aldehyde may occur, a weak acid is added to the reaction medium in an amount at least equivalent to the amount of catalyst present. By an equivalent amount, we mean an amount of acid which will just react with the total amount of catalyst present. Thus, for a bifunctional acid, one mole is sufficient to neutralise two moles of alkali metal catalyst while if a mono-functional acid is used, one mole will neutralise one mole of catalyst.

By a weak acid, we mean an acid whose dissociation constant at $25°$ C. is not greater than $10^{-3}$ and preferably not greater than $10^{-4}$.

By alkali metal catalysts we mean the metals, the simple and complex metal hydrides and organo-metallic compounds in which the metal atom is linked to a hydrocarbon group, and oxyhydrocarbon group or a substituted derivative of such groups. Example of such catalysts are lithium, sodium, potassium, caesium and rubidium; hydrides, aluminohydrides and borohydrides of these metals and the alkali metal alkyls such as methyls, ethyls, propyls and butyls; cycloalkyls such as cyclohexyls; aryls such as phenyls and tolyls; aralkyls such as benzyls; alkenyls such as vinyls and allyls; alkoxides; aminoalkoxides; cycloalkoxides; phenates and benzylates.

Both inorganic and organic weak acids may be used but I prefer to use an aliphatic carboxylic acid.

Both inorganic and organic acids may be used but I prefer to use an aliphatic carboxylic acid. Examples of acids that may be used are boric acid, acetic acid, propionic acid, isobutyric acid, n-butyric acid, n-valeric acid, trimethyl acetic acid, caproic acid, pelargonic acid and benzoic acid.

Suitable aldehydes that may be polymerised by the process of the invention are aliphatic aldehydes, cycloaliphatic aldehydes, aromatic aldehydes and substituted derivatives of these aldehydes. The preferred aldehydes are those containing up to 10 carbon atoms. Examples are formaldehyde, acetaldehyde, propionaldehyde, n-butyraldehyde, n-valeraldehyde, iso-valeraldehyde, n-caproaldehyde, benzaldehyde, cyclohexaldehyde, 2-ethylhexaldehyde and phenyl acetaldehyde.

The temperatures at which the polymerisation may be effected without substantial degradation of the polymeric product occurring will depend upon the choice of polymer. For example, formaldehyde may be polymerised in comparative safety at room temperature or even above while acetaldehyde should be polymerised below $-30°$ C. if polymer degradation is to be avoided.

In general, we prefer to use temperatures below $-60°$ C. and more preferably from $-60°$ C. to $-110°$ C. since below this latter temperature the rate of reaction is generally undesirably slow. It is preferred to effect the polymerisation in an inert atmosphere, e.g. of nitrogen gas. It is particularly preferred to effect it in the absence of air and water since these have a tendency to inhibit the polymerisation reaction.

In general, it is preferred to use from 0.01 to 2 mol percent of catalyst based on the aldehyde, 0.05 to 0.5 mol percent being particularly preferred. Amounts below 0.01 percent do not provide an economical rate of polymerisation while the use of amounts above 2 percent is uneconomical.

The amount of acid used must be at least sufficient to render the catalyst inactive and while any amounts in excess may be used I prefer to use from 1 to 2 equivalents of acid per equivalent of catalyst.

The acid should be added before the reaction medium containing the polymeric material has risen to such a temperature that degradation may occur to any substantial extent and in general it is preferred to add the acid immediately after the polymerisation and at the temperature at which the polymerisation was effected.

Where it is desired to use a solvent in the process of the invention, it is preferred to use an inert organic compound which is generally in alkene, alkane, or dialkyl ether. Preferred solvents are the lower hydrocarbons having from 2 to 7 carbon atoms per molecule, e.g. ethylene, propylene, n-butylene, isobutylene, penetane, hexane and heptane.

While sub- or super-atmospheric pressures may be used if desired, it is preferred to carry out the polymerisation at atmospheric pressure.

In a polymerisation according to the invention, an alkane solvent is cooled to the desired polymerisation temperature under an atmosphere of an inert gas such as nitrogen. To the cooled solvent is added the aldehyde, preferably in the proportion of at least one part of aldehyde to ten parts of solvent, and then the catalyst. The contents are stirred during polymerisation and on completion of the reaction sufficient of the selected weak acid is added to render the catalyst inactive. The temperature of the mixture is then allowed to rise and the polymer is filtered, washed and dried.

Since the alkali metal catalysts may be rendered ineffective by acids it is preferred that the aldehydes used in the polymerisation are purified before the reaction and more particularly that they are freed from any acid contaminants that may be formed by the oxidation of the aldehydes in the air since if acid is present in the polymerisation mixture it generally inhibits the polymerisation.

The products are polyaldehydes havng a chain structure of alternate oxygen and carbon atoms. The polymers as formed are generally terminated at one or both ends by hydroxyl groups and the presence of these groups causes a certain amount of undesirable thermal instability in the polymers. This may be reduced to a large extent by reacting the polymer with a compound that will replace the terminal hydroxyl groups with other, more stable groups. For example the polymer may be reacted with a carboxylic acid anhydride, preferably in the preseence of a tertiary amine, in which case the product is a polyaldehyde with carboxylate end groups. The carboxylated polymers derived from certain of the aldehydes may thereafter be subjected to a heat treatment in accordance with our co-pending application No. 8157/62 in order to increase their thermal stability still further. Alternatively the polymer may be reacted with an orthoester in the presence of a Lewis acid catalyst, generally boron trifluoride, so as to form the ether-ended polymer.

The high molecular weight polyaldehydes formed by the process of this invention are useful as plastic materials for the manufacture of various shaped articles such as films, sheets, fibres, filaments and the like. The polymer may be modified by the addition of heat and light stabilisers, pigments, fillers, plasticisers, and it may also be blended, if desired, with other polymeric materials.

The invention is illustrated by the following examples in which all parts are expressed as parts by weight except where otherwise indicated.

*Example 1*

A stirred mixture of 8.2 parts of n-butyraldehyde contaminated by 0.022 part of n-butyric acid, 6.3 parts of pentane and 0.1 part of sodium cyclohexoxide was kept at −78° C. under an atmosphere of dry nitrogen. Within 40 minutes the mixture had completely solidified.

After 18 hours, 20 parts of acetone were added and the whole mixture was allowed to warm to room temperature. All but a trace of the solid material dissolved and could not be recovered from the resultant solution. This was due to the fact that the organo-metallic compound acted to catalyse the degradation of the polymeric aldehyde on warming the mixture after the polymerisation.

The polymerisation was repeated and after 19 hours a solution of 0.1 part butyric acid (equivalent to 1.4 moles acid/mole of catalyst) in 20 parts of acetone was added to the mixture. The mixture was then allowed to warm to room temperature when a solid product was obtained which was separated, washed with acetone and dried at 25° C. and 15 mm. Hg for 2 days. The yield was 2.0 parts of poly(n-butyraldehyde) as a white powder.

*Example 2*

A stirred mixture of 8.2 parts of n-butyraldehyde containing 0.03 part of n-butyric acid contaminant, 6.3 parts of pentane and 0.05 part of potassium t-butoxide was kept at −78° C. under an atmosphere of dry nitrogen for 24 hours during which time the mixture completely solidified. 0.1 part of n-butyric acid as a solution in 20 parts of acetone was then added and the whole was allowed to warm to room temperature. Poly-n-butyraldehyde was obtained as a while solid.

The polymerisation was repeated without the addition of the n-butyric acid at the end and on warming, the solid product dissolved and could not be recovered from the resultant solution.

*Example 3*

The process of Example 2 was repeated using 7.8 parts of acetaldehyde containing 0.016 part of acetic acid contaminant, 6.3 parts of pentane and 0.05 part of sodium ethoxide as catalyst. At the end of the polymerisation 0.1 part of butyric acid was added as a solution in 20 parts acetone and the mixture allowed to warm to room temperature. The solids content was filtered off, washed and dried to give polyacetaldehyde as an off-white solid.

On repeating the polymerisation without the addition of the n-butyric acid at the end, the solid product dissolved on warming and could not be recovered from the resultant solution.

*Example 4*

The process of Example 3 was repeated using 8.2 parts of n-butyraldehyde containing 0.08 part of n-butyric acid contaminant. The mixture was held at −78° C. for 18 hours without any polymerisation being observed, due to the large amount of acid contamination present (equivalent to 1.25 moles of acid/mole of catalyst) which acted to neutralise the organo-metallic catalyst. A further 0.05 part of catalyst was then added to the polymerisation medium as a solution in 6.3 parts pentane. The mixture solidified within three hours. 0.1 part of butyric acid was added in 20 parts acetone and the mixture allowed to warm to room temperature whereupon the solids content was separated, washed and dried to give poly(n-butyraldehyde) as a white powder.

The polymerisation was repeated without the subsequent addition of n-butyric acid and the mixture was allowed to warm to room temperature when the solids content was separated, washed with acetone and dried at 25° C. and 15 mm. Hg for two days. The initially rubbery solid completely liquified during the drying procedure giving 2.3 parts of liquid product.

*Example 5*

A mixture of 8.2 parts of n-butyraldehyde containing 0.01 part of n-butyric acid contaminant, 6.3 parts of pentane and 0.04 part of sodium methoxide were kept at −78° C. under an atmosphere of nitrogen for 7 days during which time the mixture gradually solidified. After the addition of 0.1 part n-butyric acid in 20 parts acetone the whole was allowed to warm to room temperature when the solids content was separated, washed with acetone and dried at 25° C. and 15 mm. Hg pressure for two days to give 2.0 parts of poly(n-butyraldehyde) as a white powder.

The polymerisation was repeated without the subsequent addition of the n-butyric acid and no recoverable solid product was obtained on warming the mixture to room temperature.

By way of comparison, a further polymerisation was effected in which the monomer contained 0.1 part of n-butyric acid contaminant. No polymerisation occurred because the acid in the polymerisation medium destroyed the catalyst.

I claim:
1. In a process for the manufacture of a polymeric aldehyde selected from the group consisting of aliphatic aldehydes, cycloaliphatic aldehydes, and aromatic aldehydes by the polymerisation of an aldehyde in the presence of an alkali metal catalyst selected from the group consisting of complex metal hydrides and organo-metallic compounds in which the metal atom is linked to a member se- lected from the class consisting of hydrocarbon groups and oxyhydrocarbon groups at a temperature below that at which the alkali metal catalyst also acts as a catalyst to degrade the polymeric product, the improvement which comprises adding to the reaction medium, after the polymerisation is completed and before the reaction medium reaches a temperature at which substantial degradation of the polymeric aldehyde may occur, a weak acid having a disassociation constant at 25° C. not greater than $10^{-3}$ in an amount at least equivalent to the amount of catalyst present.

2. A process according to claim 1 in which the weak acid is an aliphatic carboxylic acid.

3. A process according to claim 1 in which the acid is added in an amount equal to from 1 to 2 equivalents per equivalent of catalyst.

4. A process according to claim 3 in which the acid is n-butyric acid.

References Cited by the Examiner

UNITED STATES PATENTS

| | | | |
|---|---|---|---|
| 2,964,500 | 12/1960 | Jenkins et al. | 260—67 |
| 3,017,389 | 1/1962 | Langsdorf et al. | 260—67 |

FOREIGN PATENTS

| | | |
|---|---|---|
| 220,367 | 3/1962 | Austria. |
| 870,775 | 6/1961 | Great Britain. |

OTHER REFERENCES

Conant et al.: Journal of the American Chemical Society, vol 54, No. 2 (1932), pp. 628–635 (page 632 relied on).

Bevington et al.: Proceedings of the Royal Society (London), vol. A196 (1949), pp. 363–378 (pages 363, 366–367, 373 and 376 relied on).

Letort et al.: Comptes Rendus, vol. 241 (1955), pp. 1765–67.

SAMUEL H. BELCH, *Primary Examiner.*

WILLIAM H. SHORT, *Examiner.*

L. M. PHYNES, *Assistant Examiner.*